(12) United States Patent
Wright

(10) Patent No.: US 6,603,422 B2
(45) Date of Patent: Aug. 5, 2003

(54) GROUND PENETRATING RADAR INCORPORATING A REAL-TIME MULTI-TARGET DIRECTION FINDING CAPABILITY

(76) Inventor: James Burton Wright, 400 Hiram Page Rd., #55, Yreka, CA (US) 96097

( * ) Notice: Subject to any disclaimer, the term of this patent is extended or adjusted under 35 U.S.C. 154(b) by 16 days.

(21) Appl. No.: 10/042,470

(22) Filed: Jan. 10, 2002

(65) Prior Publication Data

US 2002/0105455 A1 Aug. 8, 2002

Related U.S. Application Data

(60) Provisional application No. 60/249,435, filed on Nov. 17, 2000.

(51) Int. Cl.$^7$ .............................. G01S 13/88; G01V 3/12
(52) U.S. Cl. ........................ 342/22; 342/175; 342/146; 342/153
(58) Field of Search ............................. 342/22, 27, 52, 342/133, 139, 146, 153, 175, 372, 376; 343/720, 725, 729, 753, 754, 755, 761, 762, 772, 775, 781 CA, 781 P, 781 R, 786, 839, 908, 909, 911 R, 912

(56) References Cited

U.S. PATENT DOCUMENTS

| 4,825,216 A | * | 4/1989 | DuFort | 342/376 |
| 5,327,149 A | * | 7/1994 | Kuffer | 343/720 |
| 5,426,443 A | * | 6/1995 | Jenness, Jr. | 343/781 P |
| 2002/0105455 A1 | * | 8/2002 | Wright | 342/22 |

OTHER PUBLICATIONS

"Effect of internal reflections on the radiation properties and input admittance of integrated lens antennas",van der Vorst, M.J.M.,de Maagt, P.J.I.,Herben, M.H.A.J.,Microwave Theory and Techniques,IEEE Transactions on ,vol. 47 Iss: 9, 9/99, Pp. 1696–1704.*

"Effects of dielectrics on the radiation patterns of an electromagnetic horn", Oh, L.; Peng, S.; Lunden, C.; Antennas and Propagation, IEEE Transactions on [legacy, pre — 1988], vol.: 18,Issue: 4, Jul. 1970, Page(s): 553–556.*

"Free–space mesaurement of dielectric constants and loss tangents of low–loss materials using a microwave interferometer technique", Ghodgaonkar, D.K,Varadan, V.V, Varadan, V.K,Antennas and Propagation Society International Symposium Jul.'92 p. 1201 vol. 2.*

* cited by examiner

Primary Examiner—John B. Sotomayor

(57) ABSTRACT

The Ground Penetrating Radar (GPR) system introduced in this application provides data from an underground medium of the same caliber as that provided by conventional radars in air or space applications. This includes direction as well as distance to all targets, and some indication of target shape and orientation, within a conical volume of the underground having a solid angle of about 90 degrees and a radial depth of about 100 feet, under ideal conditions, as depicted in FIG. 9. The key to this capability is depicted in FIG. 3, and is a hemispheric dome (6) which is placed against the smoothed surface (1) of the underground medium (2), and which has a relative dielectric constant ($E_R$) substantially equal to that of the underground medium (2). A microwave horn antenna (3), which is filled with the same dielectric material (5) as that from which the dome is constructed, is placed against the surface (7) of this dome (6) and is moved back and forth (8), allowing the radar beam (9) of the horn antenna (3) to systematically scan the entire conical volume. The signal path of this radar antenna system is thus completely within a dielectric material having an ($E_R$) comparable to that of the underground medium, from Coax-to-Waveguide transition through to the potential underground targets. No air-to-dielectric interface, with its reflections and refractive lensing effects, remains.

1 Claim, 7 Drawing Sheets

3D View

FIG. 7
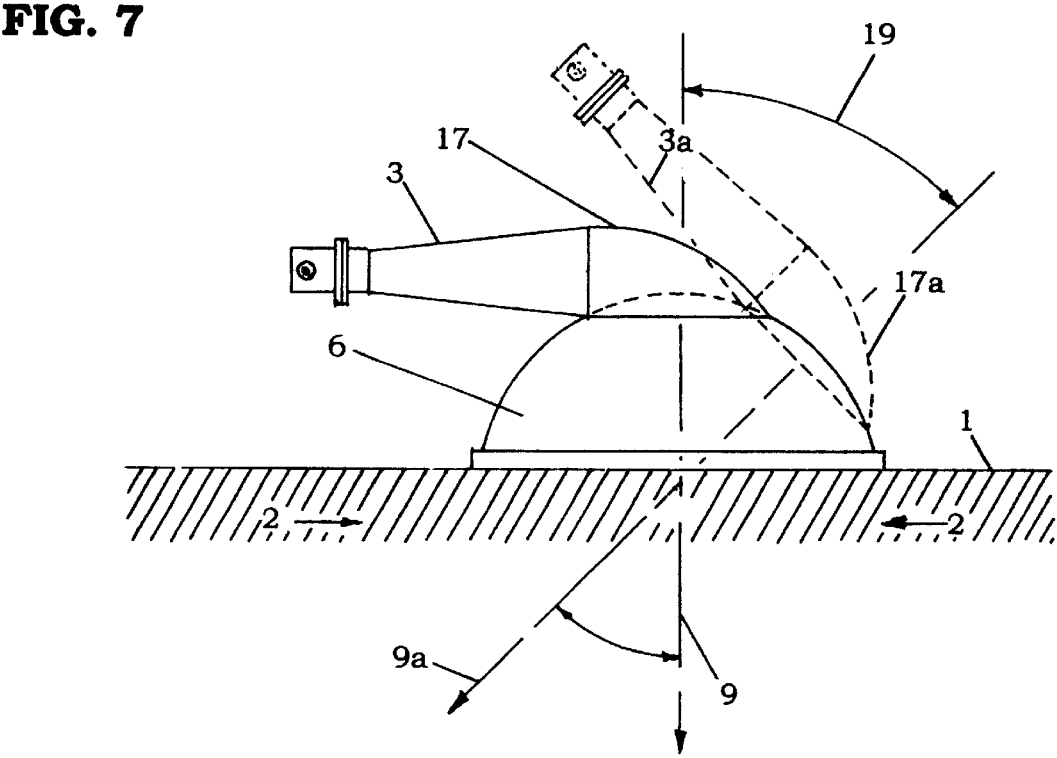
FIG. 8
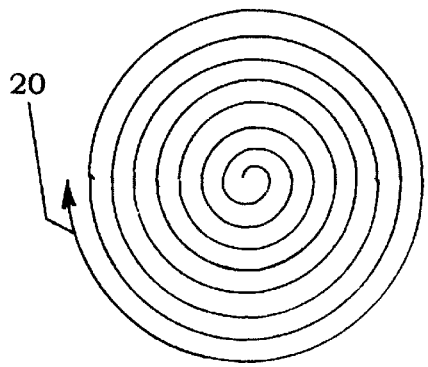
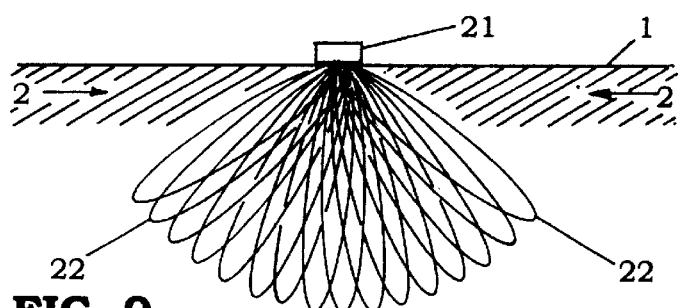
FIG. 9

GROUND PENETRATING RADAR INCORPORATING A REAL-TIME MULTI-TARGET DIRECTION FINDING CAPABILITY

CROSS REFERENCE TO RELATED APPLICATIONS

Continuation of Provisional Patent Application No. 60/249,435, Nov. 17, 2000.

STATEMENT REGARDING FEDERALLY SPONSORED RESEARCH OR DEVELOPMENT

Not Applicable

REFERENCE TO MICROFICHE APPENDIX

Not Applicable

This application is a continuation and expansion of Provisional Patent Application No. 60/249,435, Nov. 17, 2000.

BACKGROUND

Conventional ground penetrating radar (GPR) surveys are generally conducted by moving the radar antennas over the surface of the underground medium of interest along a prescribed grid pattern while taking a continuous series of radar "photographs" directly into the ground. These data are subsequently processed and integrated into composite cross-sectional displays of the underground, from which profiles of various geologic features can be discerned, and anomalies (i.e., discontinuities in an otherwise homogenous volume, or "targets") can be pinpointed.

Application of this GPR exploration technique in confined underground spaces, such as the tunnels of hard-rock mines, is not possible simply because of the rough and irregular nature of such tunnels and also because of the need to prevent the radar waves from reverberating off the tunnel walls and creating a jumble of false targets. These considerations require that the radar searches be conducted at successive smoothed sites along the walls of the mine, with the results being integrated in some fashion, or the development of the data received from a single direction, utilizing a method such as that described in referenced U.S. Pat. No. 6,091,354, or the use of a wideangle scanning system such as that presented in this application.

The present GPR invention utilizes a wide-angle view seen through a chosen "window" in the rock surface, which view is divided into some 300 narrow-angle "pixels". The data from each pixel is independently processed and recorded, and the 300 sets of data (or waveforms) are then integrated into detailed displays of the interior of the underground in any of several formats: a wide-angle face-on display of the entire scene; a range-gated face-on display to enable study of successive layers of the wide-angle scene; a slice across the center of the scene, at any angle, for offset plan-position displays; an A-scan display of any individual pixel; or a transparent 3-D display which may be rotated at will.

The features described in the foregoing paragraph are drawn from modem radar systems (e.g., airport radar; surveillance radar; gun control radar; etc.) but are features not hitherto utilized in GPR systems because of the inability of available GPR systems to scan the interior of the rock walls of a mine from one selected site. It is the unique antenna-scan system being introduced herein that allows the GPR user to incorporate these proven and very valuable techniques. It should be re-emphasized that these types of displays made available to the GPR user allow the user to obtain, in addition to direction and distance to any and all targets, an indication of the size and orientation of those targets and valuable information as to the geologic structure within the volume being surveyed.

SUMMARY

The heart of the present invention is the unique antenna system with which important operational capabilities of conventional radars are now made available to users of ground penetrating radar (GPR) systems. Specifically, this antenna system consists of a hemispherically shaped dome, having the same relative dielectric constant ($E_R$) as that of the medium to be surveyed, which is placed against a flattened portion of that medium, and a microwave horn antenna which is placed against that hemispheric dome so as to transmit through the dome and into the medium of interest, and a means of moving that horn antenna over the spherical surface of the dome and thus directing the beam of the antenna throughout the conical volume thus made available. The horn itself may be fully dielectrically "loaded", allowing its dimensions to be reduced, or may utilize a concave-convex lens (in air dielectric horns, if used) to correct for the close-in focusing effect of the dome itself.

The preferred antenna system may be as depicted in FIG. 6 and FIG. 7 where-in a horn antenna is fitted with a reflector, and a scanning method selected which is relatively easy to implement. In this instance the horn antenna is fully loaded with a dielectric material which has an $E_R$ substantially equal to that of the material being surveyed, allowing the total size of the horn-reflector assembly to be much smaller and the radar housing kept to a minimum size. Lensing is not a factor in this design.

BRIEF DESCRIPTION OF THE DRAWINGS

The invention will be more fully understood by reference to the following drawings:

FIG. 7 illustrates the same antenna-reflector configuration showing the range of antenna deflection required to achieve 100% coverage of the material cone of interest as the antenna is rotated.

FIG. 8 shows the scan pattern produce by the antenna/reflector system of scanning, as discussed in the preceding two paragraphs.

FIG. 9 is a cross-sectional view of some of the positions the beam of the horn antenna will occupy within the material being surveyed as it undergoes scanning.

DETAILED DESCRIPTION

Referring more specifically to the drawings FIG. 1 through FIG. 9, and the details therein, the essential features of the invention will become apparent. It will be appreciated that variations in the details and parts may be made without departing from the basic concepts as disclosed herein.

Figure 1:
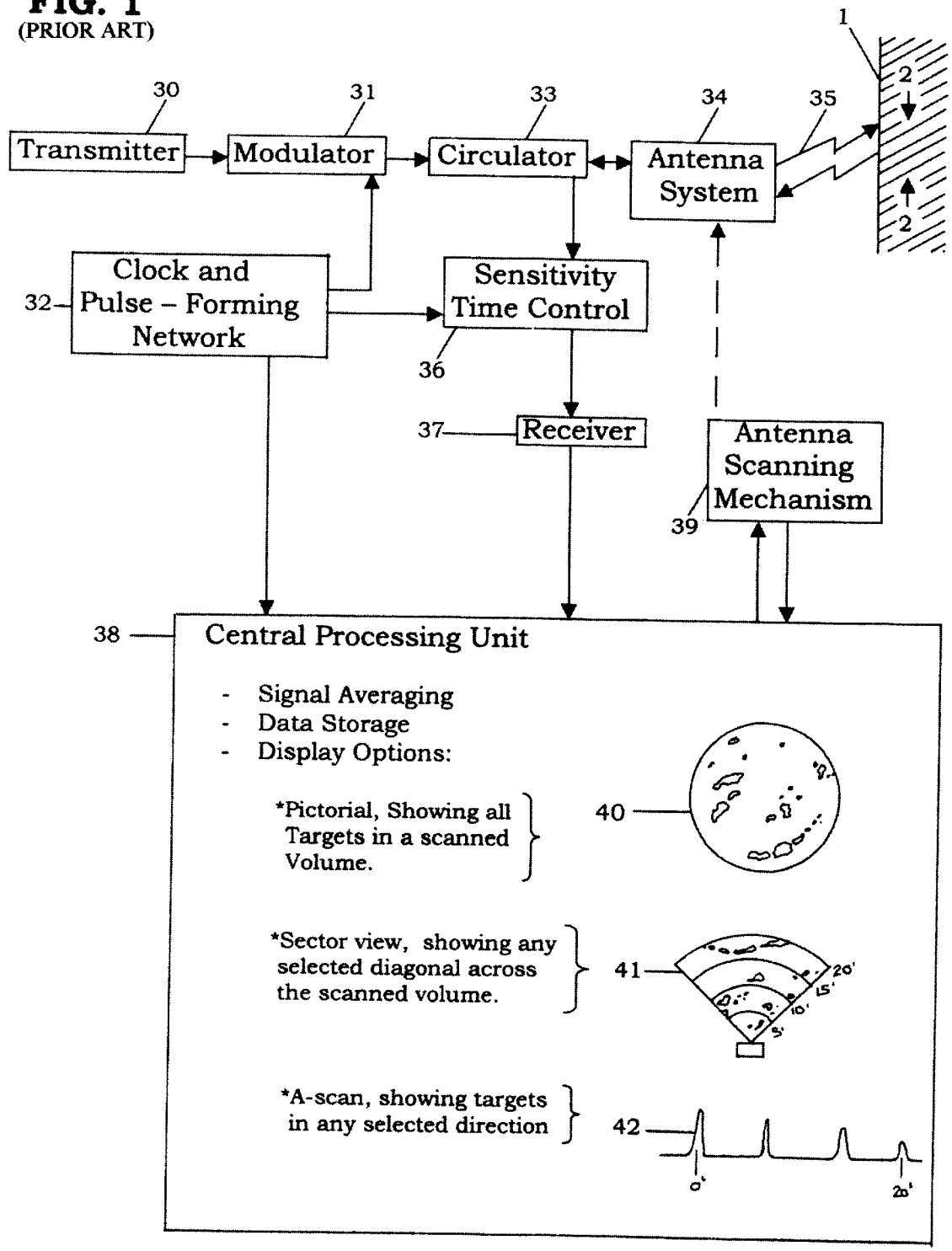
FIG. 1 is a simplified block diagram of a conventional radar system wherein the unique antenna system presented herein (34, 35) is incorporated.

FIG. 1 shows a simplified block diagram of a typical radar system which includes a transmitter 30 where-in the radio-frequency (RF) energy to be transmitted is generated by a stable oscillator and amplification is used to reach the fractional-watt peak output power required for the ground penetrating radar (GPR) system. The RF is passed through a modulator 31 that receives periodic and very narrow pulses from the clock and pulse-forming networks 32 which reduces the continuous RF output from the transmitter 30 to brief RF pulses. These RF pulses are then fed into the circulator 33, a directional coupler which directs the relatively strong RF from the modulator 31 to the antenna-system 34 and on into the medium 2 of interest. The relatively weak signals reflected from targets within the medium 2 of interest are detected by the antenna-system 34 and routed back through the circulator 33 to the sensitivity-time-control 36, which is controlled by a pulse from the clock and pulse-forming networks 32 and which serves to attenuate the main transmitted pulse and the nearer target echoes so as not to overload the receiver, and then on to the receiver 37 with a minimum of energy loss.

The receiver 37 may be of a typical super-heterodyne design, including a low-noise amplifier, a local oscillator, an RF mixer, an intermediate frequency amplifier with band-pass filtering and signal detection, wherein the transmitted and received pulses become available for processing. These base-band signals are then sent from the receiver 37 to the central processing unit 38 (CPU).

Once in the CPU 38 the returning signals undergo signal-averaging where 1000 waveforms from each of some 300 "pixels" from the surveyed scene are averaged, a process which yields a 30 db improvement in the signal-to-noise (S/N) ratios and makes possible the depths to which this radar will reach. These averaged pixel waveforms are then stored for retrieval in any desired combination to produce displays such as a pictorial view 40, an offset plan-position view 41, an A-scan view 42, and others.

Figure 2:
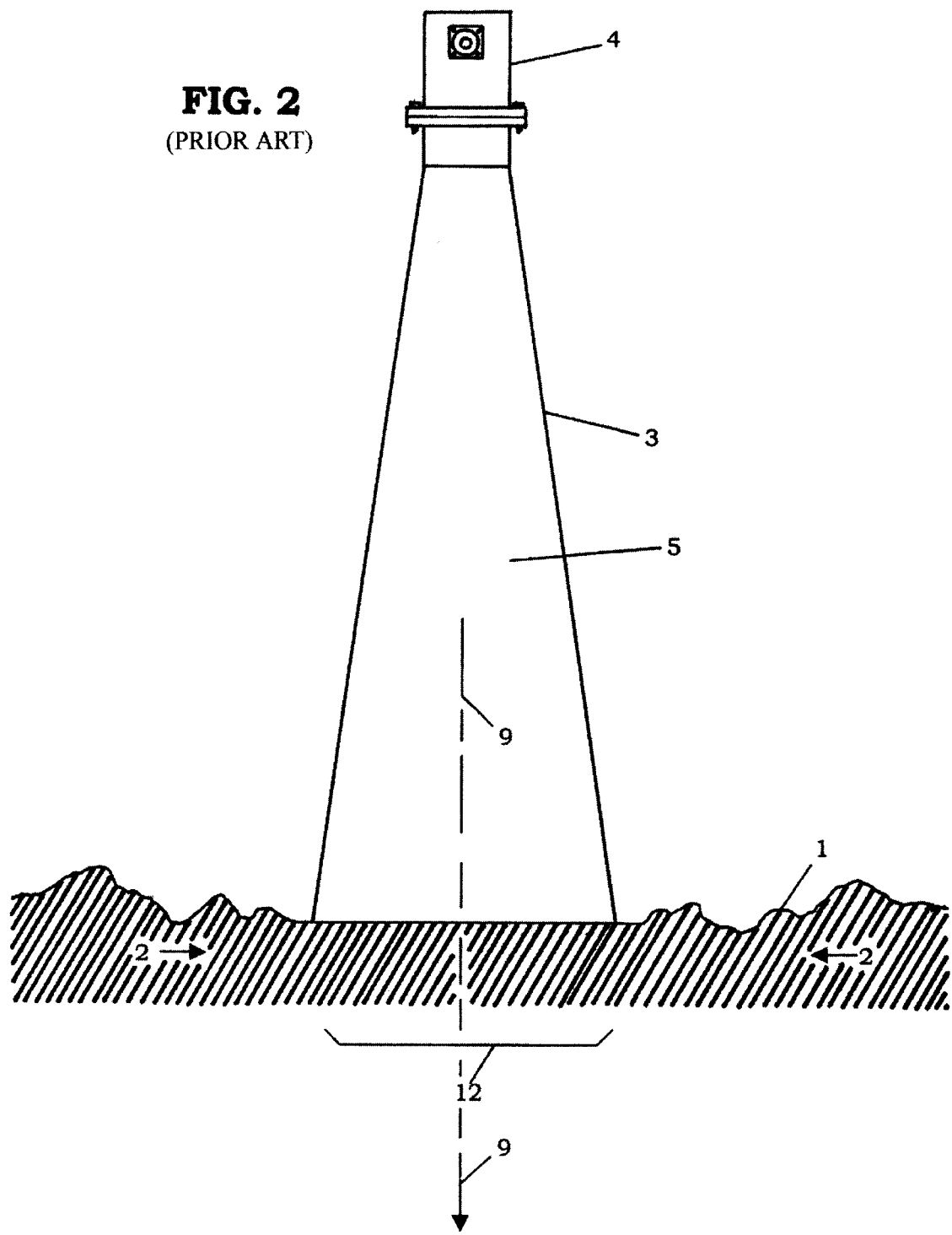
FIG. 2 shows how a basic horn antenna may be placed against the flattened surface of the medium of interest to transmit radar signals into that medium and to receive "echoes" from targets within the medium.

FIG. 2 shows direct placement of a microwave horn antenna 3 against the smoothed surface 1 of an underground medium 2. An RF signal is fed into the coax-waveguide transition 4 and travels through the microwave horn antenna 3 where it is narrowed into an elliptical beam around the beam axis 9-9. If the dielectric 5 within the horn 3 is air the beam entering the medium 2 undergoes additional narrowing and refractive gain. This setup allows the distance to the targets within the beam to be determined and their relative return signal-strengths to be observed. It gives no hint of target direction, of target configuration, or of the true reflectivity of the target.

Figure 3B:
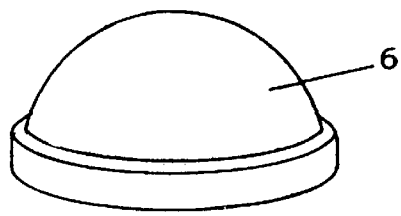
FIG. 3B is a 3-D view of the hemispheric dome.
Figure 3A:
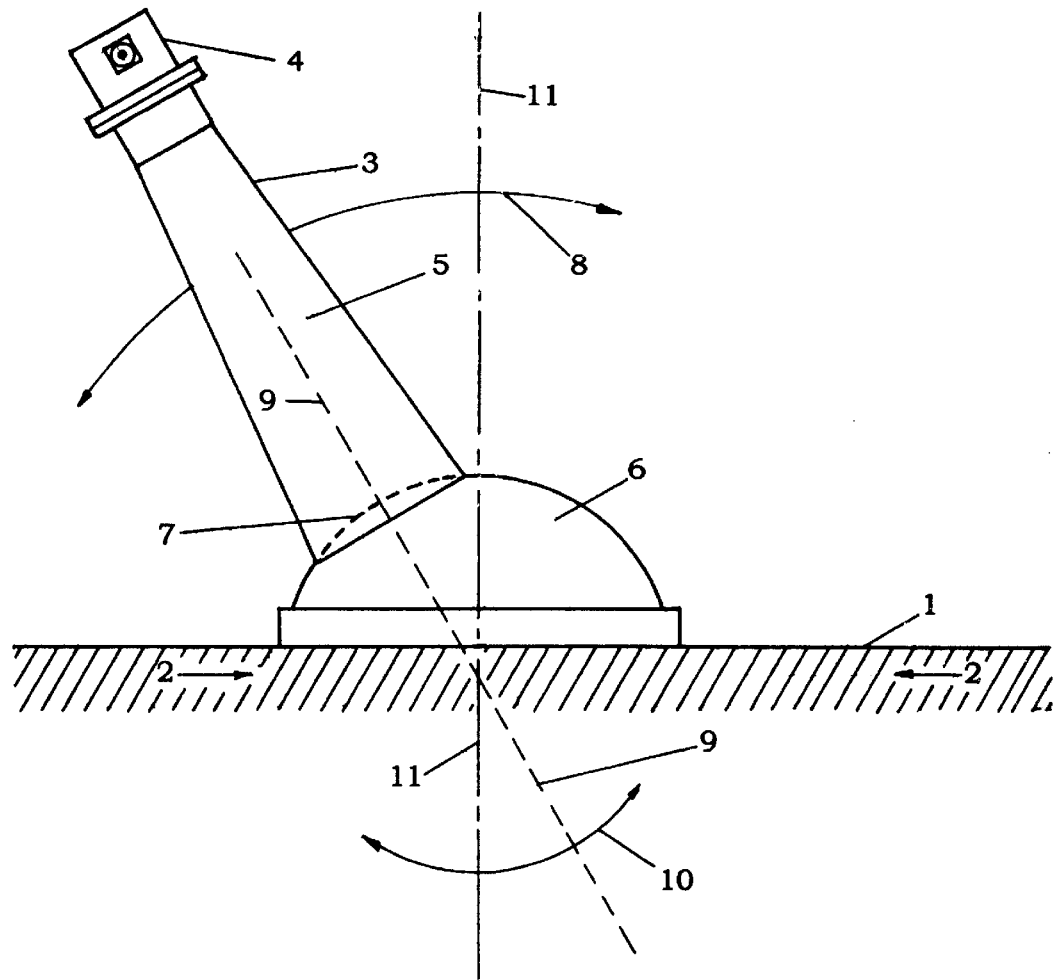
FIG. 3A illustrates the use of a hemispherically shaped dome in the antenna-to-medium signal path whereby the horn antenna becomes maneuverable in order for its radiated beam to be aimed in any direction through the dome and on into the medium of interest.

FIG. 3A demonstrates the employment of a superstructure, a hemispherically shaped dome 6 devised to allow a horn antenna 3 to be moved about as indicated by arc 8 over the surface 7 of the dome 6, thus enabling the RF beam 9-9 of the antenna assembly to be aimed through an arc 10 towards any point within a conical volume of the material 2 being surveyed. Line 11-11 represents the vertical axis of that conical volume.

FIG. 3B is a 3-D view of the hemispheric dome 6, for perspective.

Figure 4:
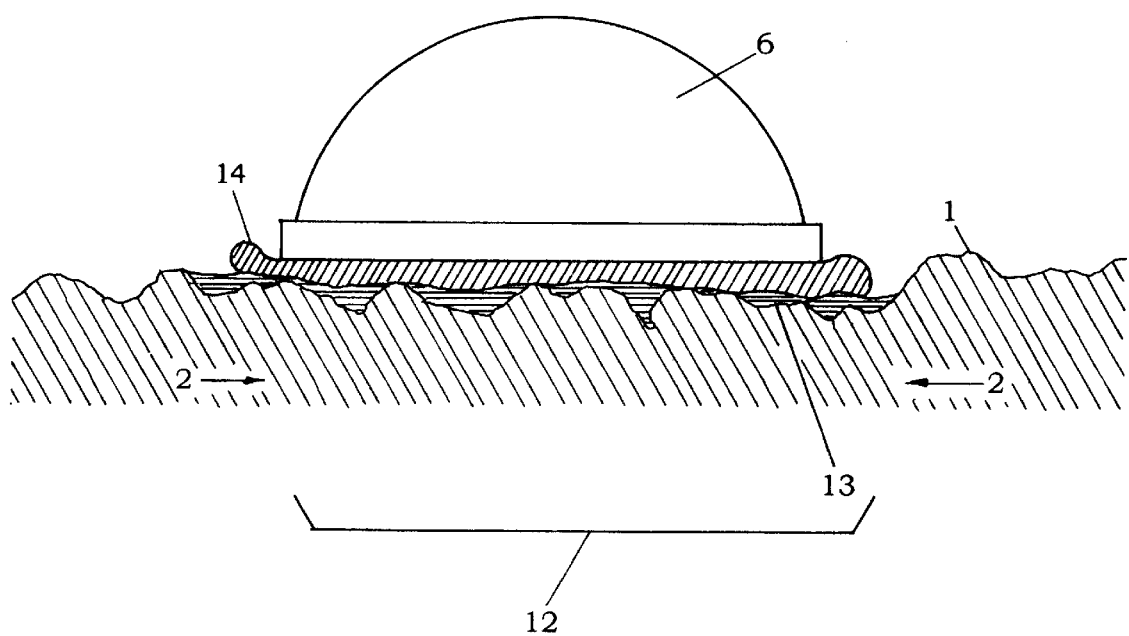
FIG. 4 illustrates how the problem of achieving undistorted transmission of the radiated radar beam through the dome-to-medium interface may be resolved.

FIG. 4 depicts a means of achieving the necessary smooth interface area on the surface 1 of the medium 2 being surveyed, especially useful if that medium 2 is rock. Rock surfaces are usually quite rough and, if of a crystalline structure such as quartz, often possess deep fissures. A selected area 12 on the wall is first hammered free of major protrusions to achieve a rough smoothing of the surface 1. Following this a relatively stiff putty 13, mixed to achieve an $E_R$ matching that of medium 2, is pressed into the crevices and other depressions in the surface 1 to achieve additional smoothing. Finally, a thin pillow is filled with a second compound 14, selected and mixed to achieve an $E_R$ matching that of medium 2 and also for a high degree of malleability, for placement between the semi-smooth surface 1 of the underground medium 2 and the flat base of the hemispheric dome 6, to be caused to "flow" under hand pressure so as to eliminate all air remaining in the interface area. The goal is to erect a super-structure that will pass the radar RF beam without refraction in any position to which the antenna 4 may be moved.

Figure 5:
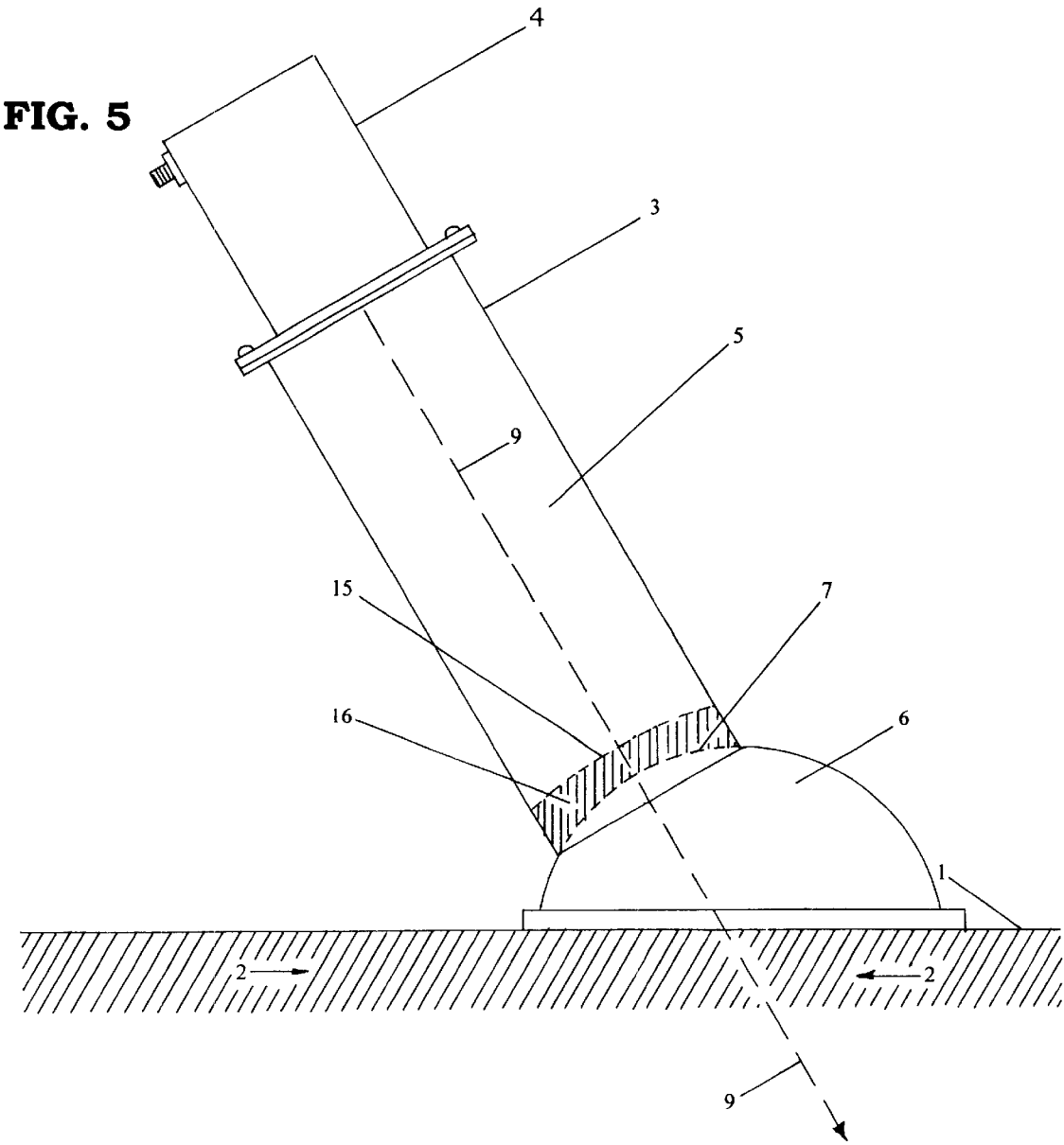
FIG. 5 shows how a corrective lens, which may have the same $E_R$ as that of the hemispheric dome, is used to provide the proper focus for an air dielectric horn antenna transmitting through the dome.

FIG. 5 shows the use of an air-dielectric 5 cylindrical horn antenna 3 being held against the hemispheric dome 6. In this setup the surface 7 of the dome 6 has a radius so small that the antenna beam 9-9 is focused at a point just a few inches inside the medium 2 being surveyed. Through the use of a concave-convex lens 16, ground to a radius determined by the surface 7 of the dome 6 on the concave side and to a much larger radius on the convex side 15, the focal point is moved to a point deep within the medium 2 being surveyed. Thus all targets, near and far, are seen without distortion.

Figure 6:
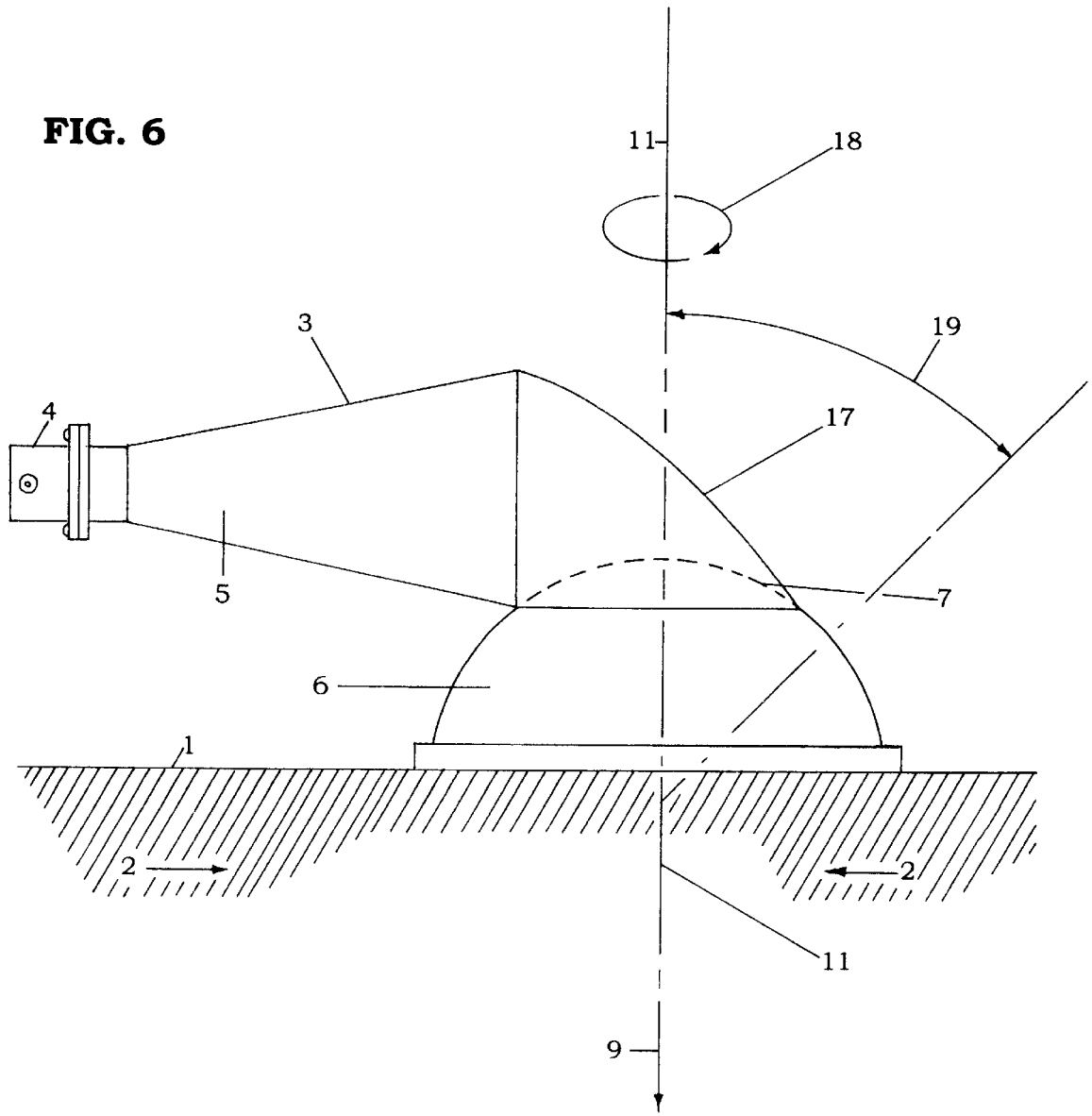
FIG. 6 illustrates the use of a dielectrically loaded horn antenna, with integral reflector, to achieve a more compact operating system and for ease in rotation and deflection.

FIG. 6 is a sketch of a horn antenna 3 and hemispheric dome 6 configured to allow full automatic scanning of the conical volume of the medium 2 being surveyed using the smallest possible housing. Here the horn antenna 3 is fitted with a properly shaped reflector 17 designed to re-direct the RF beam 9 leaving the horn antenna 3 at an angle of 90 degrees to the horn. To achieve minimum size of the entire antenna system the horn antenna 3, including the volume enclosed by the reflector 17 and the Coax-to-Waveguide transition 4, is filled with a dielectric having an $E_R$ matching that of the hemispheric dome 6 and the underground medium 2. The horn antenna and reflector assembly is then rotated 18 around axis 11-11 while it is simultaneously slowly deflected 19 by an angle of about 45 degrees, with one deflection per about eight rotations.

FIG. 7 is intended to show more clearly the deflection 19 that accompanies the horn antenna 3 rotation, i.e., as the horn antenna 3 moves to position 3a.

FIG. 8 depicts the scan-pattern 20 that is obtained through the simultaneous deflection and rotation of the horn antenna 3, as sketched in FIG. 6 and FIG. 7.

FIG. 9 is a cross-sectional view of various positions which the radiated RF beam 22 will occupy as a result of the scan technique described in FIG. 6 and FIG. 7. The radar 21 located at the surface 1 of the medium 2 being surveyed transmits a continuous series of pulses in a spiral pattern as shown in FIG. 8 into a conical volume of the underground medium 2 covering a solid angle of 90 degrees and generating a map of all that is within that conical volume, to a depth of 100 feet under ideal conditions. (Note that the transmitted beam at +/−45° has the same strength as it does at 0°, which is not the case with a phased-array scan.)

With reference to paragraph "FIG. 6" (above) it can be seen that the antenna system presented herein involves effectively embedding that system in the underground medium of interest, just as a conventional radar antenna system is embedded in air, or in space. An obvious extension of this "embedding" technique would be to bury a phased-array antenna in a cement having an $E_R$ matching that of the underground medium and placing this embedded phased-array antenna system against the medium being explored, again eliminating air from the transmitter to target path.

I claim:

1. A ground penetrating radar (GPR) antenna system for locating objects in an underground medium, specifically for determining their direction as well as their depth from the radar antenna position, comprising:

(a) a special hemispherically-shaped dielectric dome, having a relative dielectric constant ($E_R$) which is substantially equal to that of the underground medium of interest, for placement between the microwave horn antenna and the underground medium;

(b) a moldable putty, having an $E_R$ substantially equal to that of the underground medium of interest, consisting of a mixture of lime and petroleum jelly in proper proportions, for use in roughly smoothing the surface of the underground medium by filling in the deeper depressions;

(c) a malleable mixture of tiny glass spheres and petroleum jelly, mixed in such proportions as to achieve an $E_R$ substantially equal to that of the underground medium, for placement between the roughly smoothed surface of the underground medium and the flat side of the hemispheric dome;

(d) a conical horn-type of microwave antenna with its aperture shaped to fit against the curved surface of the hemispheric dome described in claim 1(a);

(e) a concave-convex lens for placement inside the aperture of the microwave horn antenna of claim 1(d), having an $E_R$ substantially equal to that of the hemispheric dome, for correction of the near-in focusing effect of the dome.

(f) a microwave horn-antenna completely filled (including the Coax-Waveguide Transistion) with a dielectric material having an $E_R$ substantially equal to that used in the hemispheric dome of claim 1(a).

(g) a microwave horn-antenna, with reflector, completely filled with a dielectric material having an $E_R$ substantially equal to that of which the hemispheric dome of claim 1(a) is made.

* * * * *